US012800416B2

(12) United States Patent
Mohammadi et al.

(10) Patent No.: US 12,800,416 B2
(45) Date of Patent: Nov. 17, 2026

(54) MULTI-SENSITIVITY METAMATERIAL FORCE SENSOR

(71) Applicant: The University of Melbourne, Parkville (AU)

(72) Inventors: Alireza Mohammadi, Parkville (AU); Denny Nurjanto Oetomo, Parkville (AU); Ying Tan, Parkville (AU); Peter Fook Meng Choong, Parkville (AU)

(73) Assignee: The University Of Melbourne, Parkville (AU)

( * ) Notice: Subject to any disclaimer, the term of this patent is extended or adjusted under 35 U.S.C. 154(b) by 280 days.

(21) Appl. No.: 18/566,339

(22) PCT Filed: Jun. 2, 2022

(86) PCT No.: PCT/AU2022/050541
§ 371 (c)(1),
(2) Date: Dec. 1, 2023

(87) PCT Pub. No.: WO2022/251917
PCT Pub. Date: Dec. 8, 2022

(65) Prior Publication Data

US 2024/0264021 A1 Aug. 8, 2024

(30) Foreign Application Priority Data

Jun. 2, 2021 (AU) ................................ 2021901648

(51) Int. Cl.
*G01L 5/169* (2020.01)
*B32B 3/12* (2006.01)
*G01L 1/04* (2006.01)

(52) U.S. Cl.
CPC ................ *G01L 5/169* (2020.01); *B32B 3/12* (2013.01); *G01L 1/04* (2013.01)

(58) Field of Classification Search
CPC . G01L 5/228; G01L 1/04; G01L 1/205; B23B 3/02; B23B 3/12; B23B 3/14
See application file for complete search history.

(56) References Cited

U.S. PATENT DOCUMENTS 5,165,125 A * 11/1992 Callaway ............ A47C 23/002 5/255
5,206,557 A * 4/1993 Bobbio ................ B06B 1/0292 310/309

(Continued)

FOREIGN PATENT DOCUMENTS

CN 109085382 B 11/2019
WO WO-2018189719 A1 * 10/2018 ............. F16F 15/02
WO 2019227082 A1 11/2019

OTHER PUBLICATIONS

International Search Report for Application No. PCT/AU2022/050541 dated Jun. 20, 2022, 3 pages.

(Continued)

*Primary Examiner* — Tran M. Tran
(74) *Attorney, Agent, or Firm* — Howard & Howard Attorneys PLLC

(57) ABSTRACT

A metamaterial force sensor, the sensor comprising: one or more metamaterial modules, each module comprising a plurality of mechanical unit cells operatively interconnected to allow force transmission therethrough; a transducer operatively coupled to the or each module, the transducer being configured to output a signal corresponding to a displacement of the or each module in response to a force transmission, wherein each of the mechanical unit cells provides a predetermined range of displacement, based on preconfigured structural parameters of said unit cell, in response to force transmissions, and wherein at least two of the mechanical unit cells of the or each module are configured with different predetermined ranges of displacement in (Continued)

response to force transmissions resulting in multiple sensitivity regimes.

20 Claims, 7 Drawing Sheets

(56) References Cited

U.S. PATENT DOCUMENTS

| | | | | | |
|---|---|---|---|---|---|
| 5,280,890 | A * | 1/1994 | Wydra | F16F 1/426 267/153 |
| 5,497,861 | A * | 3/1996 | Brotz | F16F 13/30 267/140.5 |
| 5,551,673 | A * | 9/1996 | Furusawa | B60R 19/02 267/165 |
| 5,563,466 | A * | 10/1996 | Rennex | H02N 1/006 318/116 |
| 6,345,814 | B1 * | 2/2002 | Lawson | B60G 15/066 267/153 |
| 6,533,258 | B2 * | 3/2003 | Monson | F16F 1/374 267/141 |
| 7,047,818 | B2 * | 5/2006 | Dallenbach | G01L 1/142 73/780 |
| 7,598,652 | B2 * | 10/2009 | Kornbluh | B64C 3/48 310/309 |
| 7,669,918 | B2 * | 3/2010 | Buravalla | B62D 25/00 296/187.11 |
| 8,436,508 | B2 * | 5/2013 | Kornbluh | H02N 1/00 310/309 |
| 9,140,767 | B2 * | 9/2015 | Werner | G01R 33/36 |
| 9,464,001 | B2 * | 10/2016 | Mitchell | G10K 11/165 |
| 10,030,733 | B2 * | 7/2018 | Seepersad | F16F 7/00 |
| 10,594,029 | B2 * | 3/2020 | Liff | H04L 63/1475 |
| 10,677,307 | B2 * | 6/2020 | Aagaard | G06F 1/1616 |
| 10,833,721 | B2 * | 11/2020 | Urzhumov | H04B 1/40 |
| 11,174,911 | B2 * | 11/2021 | Kang | F16F 3/00 |
| 11,193,551 | B2 * | 12/2021 | Jahromi | F16F 7/00 |
| 11,530,731 | B2 * | 12/2022 | Wu | G10K 11/162 |
| 11,686,638 | B2 * | 6/2023 | Farhangdoust | G01L 9/008 73/721 |
| 11,761,503 | B2 * | 9/2023 | Rueger | F16F 7/00 267/140.5 |
| 11,964,384 | B2 * | 4/2024 | Jiang | B25J 15/00 |
| 12,101,041 | B2 * | 9/2024 | Farhangdoust | H01Q 15/0086 |
| 12,241,798 | B2 * | 3/2025 | Alavi | H02N 2/186 |
| 12,255,555 | B2 * | 3/2025 | Alavi | H01B 5/00 |
| 2013/0302633 | A1 * | 11/2013 | Pellegrino | G02B 26/0825 428/116 |
| 2016/0322560 | A1 | 11/2016 | Sirbuly et al. | |
| 2016/0325520 | A1 * | 11/2016 | Berger | F16S 3/08 |
| 2017/0051806 | A1 * | 2/2017 | Kang | B33Y 80/00 |
| 2018/0049655 | A1 | 2/2018 | Melnykowycz et al. | |
| 2018/0348025 | A1 * | 12/2018 | Jahromi | F03G 7/0614 |
| 2021/0095369 | A1 * | 4/2021 | Nam | C23C 16/01 |
| 2021/0234089 | A1 * | 7/2021 | Zheng | B33Y 80/00 |
| 2024/0161862 | A1 * | 5/2024 | Li | G12B 1/02 |
| 2024/0167815 | A1 * | 5/2024 | Schossmann | G01B 15/06 |
| 2024/0167896 | A1 * | 5/2024 | Folkmer | G01L 1/04 |
| 2025/0102371 | A1 * | 3/2025 | Guerinoni | B81B 3/0024 |
| 2025/0270810 | A1 * | 8/2025 | Pasini | E04C 1/39 |

OTHER PUBLICATIONS

English language abstract and machine-assisted English translation for CN 109085382 B extracted from espacenet. com database on Dec. 5, 2023, 13 pages.

Sun, R., "Mechanical Meta Structures with Integrated Flexible Electronics Systems", Phd Thesis, University of Bristol Faculty of Engineering, May 1, 2019, 189 pages.

* cited by examiner

MULTI-SENSITIVITY METAMATERIAL FORCE SENSOR

CROSS-REFERENCE TO RELATED APPLICATIONS

The present application is the National Stage of International Patent Application No. PCT/AU2022/050541 filed on Jun. 2, 2022, which claims priority to and all the benefits of Application No. AU 2021901648 filed on Jun. 2, 2021, both of which are hereby expressly incorporated herein by reference in their entirety.

FIELD OF THE INVENTION

This invention relates to force sensors, and in particular adaptable tactile force sensors and their method of construction for use with multiple sensitivities at multiple force sensing ranges.

BACKGROUND

Any reference in this specification to prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

There has been a great deal of interest in soft and flexible tactile force sensors due to their inherent safety for interaction with humans and the environment, flexibility for wearable devices, and ease of integration into applications such as soft robotic hands for dexterous object manipulation, smart prosthesis, and health monitoring. As physical interactions for such applications become more complex in changing environmental conditions, there is a strong need for tactile sensors which can accommodate a wide range of interaction forces while maintaining a high degree of sensitivity to minute changes in magnitude. For instance, in order for a robotic hand to adeptly manipulate an object, the hand may require tactile sensors with different sensitivities at different force detection ranges so as to integrate different contact and interaction stages, such as tactile or multi-modal object recognition, texture identification, slip detection and in-hand manipulation.

Conventional soft tactile sensors generally only provide a single predetermined force detection sensitivity and dynamic range depending on the stiffness of the force transfer material and sensing principles (for example, resistive, capacitive, optical). An intrinsic problem with force sensors is the trade-off between sensitivity and detection range, and the mechanical structures of conventional soft tactile sensors are typically calibrated to have either high sensitivity for a narrow force detection range or low sensitivity for a wider force detection range. Conventional attempts at widening the force detection range while keeping the sensitivity at a reliable level (simultaneously achieving both high detection sensitivity and wide detection range) include using hierarchical fabric-based resistive sensors, intrafillable microstructures, multilevel microstructures or flexible piezoresistive sensors based on pressure-peak effect. A drawback of these conventional approaches is that materials developed in this manner for a sensor of specific operating range of sensitivity and force detection cannot readily be adapted for use with new applications requiring a different range of operating parameters.

The applicant has determined that it would be advantageous to provide an improved force sensor using metamaterial and its method of manufacture. The present invention seeks to at least in part alleviate the above-identified problems or to offer the public with a useful choice.

SUMMARY OF THE INVENTION

According to an aspect of the present invention, there is provided a metamaterial force sensor, the sensor comprising: one or more metamaterial modules, each module comprising a plurality of mechanical unit cells operatively interconnected to allow force transmission therethrough; a transducer operatively coupled to the or each module, the transducer being configured to output a signal corresponding to a displacement of the or each module in response to a force transmission, wherein each of the mechanical unit cells provides a predetermined range of displacement, based on preconfigured structural parameters of said unit cell, in response to force transmissions, and wherein at least two of the mechanical unit cells of the or each module are configured with different predetermined ranges of displacement in response to force transmissions.

Preferably, the mechanical unit cells are configured with top and bottom plates connected by a number of resilient angular side plates, and wherein the preconfigured structural parameters for altering the displacement response include height, width and thickness of the plates as well as internal angles of the angular side plate.

Preferably, the mechanical unit cells are configured with a substantially octagonal cross-sectional shape.

Preferably, the top and bottom plates are connected by four annularly spaced resilient angular side plates.

Preferably, the mechanical unit cells are made from a resilient and compliant material.

Alternatively, at least three of the mechanical unit cells of the or each module are configured with different predetermined ranges of displacement in response to force transmissions.

Preferably, the mechanical unit cells of each module are stacked in a substantially upright manner with a first end corresponding to a top part of the module and a second end corresponding to a base part of the module.

Preferably, the metamaterial array further comprises a force transmission medium configured in mechanical communication with the module at the first end.

Preferably, the metamaterial array further comprises a substrate at the second end for operatively coupling a plurality of modules.

Preferably, the mechanical unit cells of the module are arranged so that each descending unit cell in the stack is preconfigured with an increasingly higher stiffness value.

Preferably, the mechanical unit cells of the module are arranged so that each unit cell would reach its maximum displacement in response to a force transmission before the next lower unit cell in the stack starts its displacement in response to the same force transmission.

Preferably, one or more of the mechanical unit cells of each module is coupled, in a substantially horizontal plane, to a like-unit cell by way of one or more mechanical link portions.

Preferably, the preconfigured structural parameters for altering a displacement response of the horizontally connected unit cells include length and thickness of the or each mechanical link portion.

Preferably, the modules are connected to adjacent like-modules by way of one or more further mechanical link portions.

Preferably, the preconfigured structural parameters for altering a displacement response of the adjacently connected modules include length and thickness of the or each further mechanical link portion.

Preferably, the transducer operates magnetically to determine the displacement of the or each module in response to a force transmission and outputs the displacement information as an electrical signal. Preferably, the transducer is a Hall Effect sensor.

Preferably, the transducer uses resistive or capacitive methods to determine the displacement of the or each module in response to a force transmission.

According to another aspect of the present invention, there is provided a metamaterial force sensor, the sensor comprising: one or more metamaterial modules, each module comprising a plurality of mechanical unit cells operatively interconnected to allow force transmission therethrough; a transducer operatively coupled to the or each module, the transducer being configured to output a signal corresponding to a displacement of the or each module in response to a force transmission, wherein each of the mechanical unit cells is configured with a predetermined stiffness value based on preconfigured structural parameters of said unit cell, and wherein at least two of the mechanical unit cells of the or each module are configured with different stiffness values.

Preferably, the mechanical unit cells of each module are stacked in a substantially upright manner.

Preferably, the mechanical unit cells of the module are arranged so that each descending unit cell in the stack is preconfigured with a higher stiffness value.

Preferably, the mechanical unit cells of the module are arranged so that each unit cell would reach its maximum displacement in response to a force transmission before the next lower unit cell in the stack starts its displacement in response to the same force transmission.

According to a further aspect of the present invention, there is provided an array of metamaterial force sensors, the array comprising a plurality of sensors as described above operatively interconnected and arranged in a single layered sheet array.

Preferably, the arrangement of mechanical unit cells for each of the modules in the layered sheet array is substantially the same.

Preferably, the plurality of sensors are connected to a common substrate.

Preferably, one or more said sensors are connected to an adjacent like-sensor by way of one or more additional mechanical link portions.

Preferably, preconfigured structural parameters for altering a displacement response of the adjacently connected sensors include length and thickness of the or each additional mechanical link portion.

According to yet a further aspect of the present invention, there is provided a method of constructing a metamaterial force sensor as described above, the method comprising the steps of: selecting a predetermined sensitivity range for the sensor; selecting a predetermined effective force detection range for the sensor; preconfiguring structural parameters of a plurality of mechanical unit cells to alter a stiffness value in respect of each unit cell such that the unit cells, in combination, cover at least the predetermined sensitivity range and the predetermined effective force detection range; interconnecting the plurality of mechanical unit cells to form a metamaterial module; and coupling a transducer to the module to output a signal corresponding to a displacement of the module in response to a force transmission.

Preferably, each of the mechanical unit cells in the metamaterial module is configured to overlap in coverage of the predetermined sensitivity range and the predetermined effective force detection range in respect to an adjacently arranged unit cell.

Preferably, the mechanical unit cells of each module are stacked in a substantially upright manner.

Preferably, the mechanical unit cells of the module are arranged so that each descending unit cell in the stack is preconfigured with a higher stiffness value.

Further aspects of the present invention and further embodiments of the aspects described in the preceding paragraphs will become apparent from the following description.

While components of the metamaterial force sensor will be described below for use in combination with each other in the preferred embodiments of the present invention, it is to be understood by a skilled person that some aspects of the present invention are equally suitable to be used interchangeably between one or more embodiments of the present invention and/or suitable for use as standalone inventions that can be individually incorporated into other sensors and systems not described herein.

DESCRIPTION OF THE DRAWINGS

The invention will now be described, by way of non-limiting example only, with reference to the accompanying drawings, in which.

DETAILED DESCRIPTION

Preferred embodiments of the present invention seek to provide a new type of pre-configurable metamaterial force sensor 10 using metamaterial modules 12 each comprising multiple layers of mechanical unit cells 4, 6, 8 that can be configured for different applications requiring multiple operating ranges of sensitivity and force detection.

Figure 1:
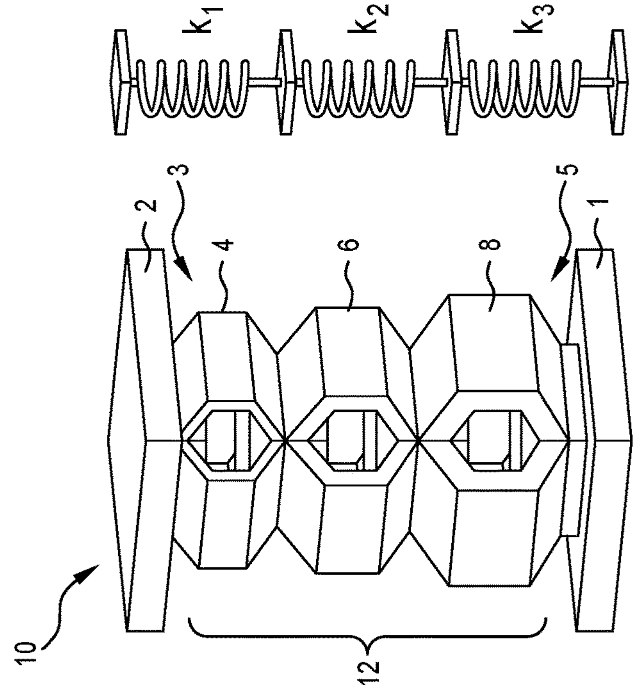
FIG. 1 is a perspective view of a schematic illustration of a metamaterial force sensor in accordance with an exemplary embodiment of the present invention.

FIG. 1 illustrates a metamaterial force sensor 10 in accordance with an exemplary embodiment of the present invention having a metamaterial module 12 which comprises a plurality of mechanical unit cells 4, 6, 8 operatively interconnected with each other to allow force transmission therethrough. In the embodiment shown, the mechanical unit cells 4, 6, 8 are arranged in a serial connection in the form of an upright stack to allow effective force transmission between a top part 3 of the module 12 and a base part 5 of the module 12. A force transmission medium 2 is provided to interface with a contact object, and the transmission medium 2 is coupled to the module 12 at or near the top part 3. A substrate 1 is provided at the base part 5 of the module 12 for connection with a transducer and/or joining multiple modules 12. Even though three unit cells 4, 6, 8 per module 12 have been shown in the Figures in accordance with an embodiment of the present invention, the number of unit cells 4, 6, 8 in a given module 12 may vary and be of any suitable number. It is to be appreciated that the number, size and shape of the mechanical unit cells 4, 6, 8 as well as the manner in which the unit cells are interconnected may vary without departing from the spirit of the invention. It is to be appreciated that while preferred embodiments of invention have been described with the mechanical unit cells 4, 6, 8 arranged in an upright stack, other non-upright configurations are also possible and the invention is not limited to be in the upright orientation.

Figure 4:
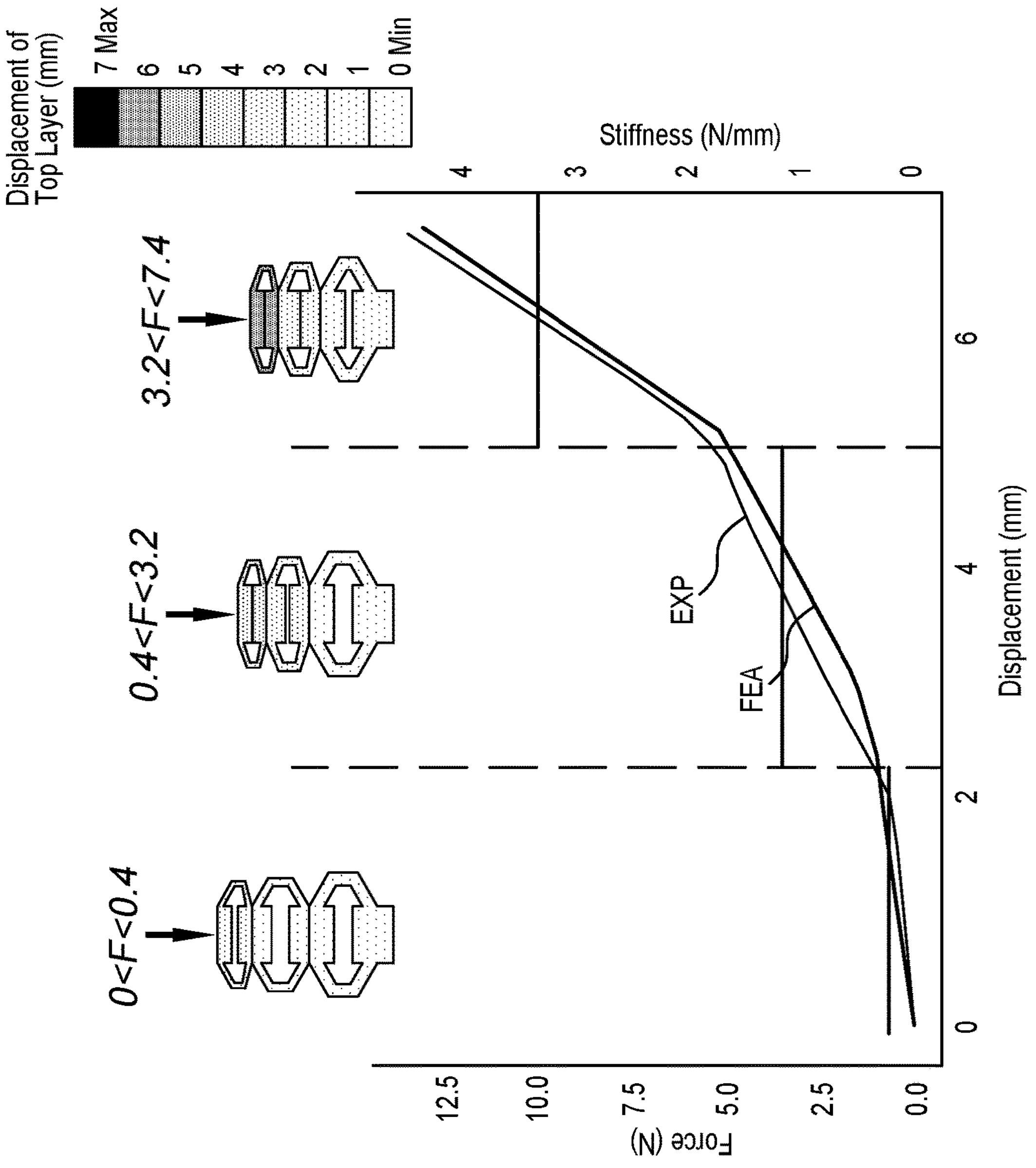
FIG. 4 is a chart showing various compression states of the metamaterial force sensor in accordance with an embodiment of the present invention.
Figure 3:
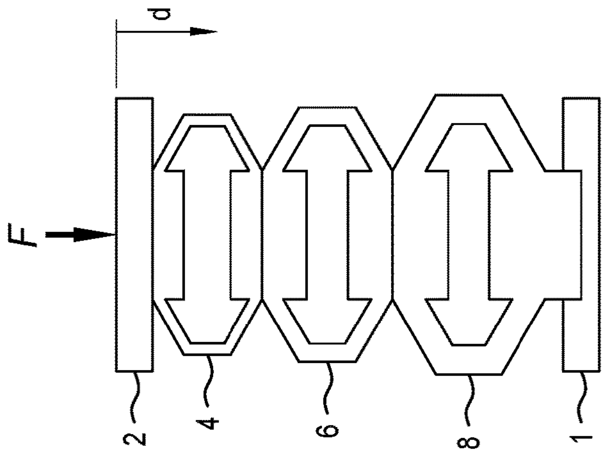
FIG. 3 is a schematic sectional view of the metamaterial force sensor of FIG. 1.

With reference to FIGS. 1, 3 and 4, each mechanical unit cell 4, 6, 8 is made from a resilient material with a substantially predictable stiffness value (k), which provides a determinable range of displacement (d) in response to a force transmission (F) or stimulus in a given direction (downwards, for example). The interconnection of mechanical unit cells 4, 6, 8 with different stiffness values ($k_1$, $k_2$, $k_3$), in the serial manner as shown, creates an aggregate metamaterial that incorporates the response properties of each of the different individual component stiffness values ($k_1$, $k_2$, $k_3$). In use, each of the mechanical unit cells 4, 6, 8 will, in response to a force transmission (F), deform (become displaced in the longitudinal direction, for example) in accordance with its specific stiffness value (k). The mechanical unit cell 4, 6, 8 with a lower stiffness value (k) in the series will deform further (greater displacement) than the mechanical unit cell 4, 6, 8 with a higher stiffness value (k).

In the preferred embodiment, the module 12 comprises at least two mechanical unit cells 4, 6, 8 with different stiffness values (k) or predetermined ranges of displacement (d) in response to force transmissions (F). In other configurations, the number of mechanical unit cells 4, 6, 8 with different stiffness values (k) in the module 12 may be three or more as required. In the stacked serial arrangement as shown, the metamaterial module 12, owing to different stiffness values (k) of mechanical unit cells 4, 6, 8, will experience varying levels of total linear displacement (d) in response to a range of force transmissions (F). The total displacement of the module 12 in response to a force (F) can be measured by a suitable transducer, which converts the displacement value (d) of the module 12 to an appropriate output signal.

Referring to the embodiment shown in FIGS. 3 and 4, each of the three mechanical unit cells 4, 6, 8 of the module 12 is preconfigured with a different stiffness value (f). In addition, each descending unit cell 6, 8 in the upright stack is also preconfigured with an increasingly higher stiffness value (k). Owing to this configuration of the mechanical unit cells 4, 6, 8 in the metamaterial module 12, the module 12 will exhibit appreciable levels of displacement (measureable sensitivity) in response to three different force detection ranges as seen in the chart of FIG. 4. In the example provided, the first mechanical unit cell 4 with a relatively lower stiffness value ($k_1$) reacted to force transmissions (F) in the range of between 0 and 0.4 N and produced a sensitive displacement response, while a combination of the first and second mechanical unit cells 4, 6 provided a measurable sensitive displacement response to force transmissions (F) in the range of between 0.4 N and 3.2 N, and finally the combination of all three mechanical unit cells 4, 6, 8 provided a measurable sensitive displacement response to much larger force transmissions (F) in the range of between 3.2 N to 7.4 N. It is to be noted that in the example above, the first mechanical unit cell 4 substantially reached its maximum displacement in response to higher force inputs before mechanical unit cells 6, 8 in the lower stack starts its displacements (or in some cases, reaches its maximum displacement) in response to the same higher force inputs.

The metamaterial module 12, through the use of preconfigured mechanical unit cells 4, 6, 8 with different stiffness values (k), is able to provide fine levels of displacement (measurable sensitivity) in response to a wide range of force input magnitudes. The number of mechanical unit cells 4, 6, 8 and their stiffness values (k) can each be configured to suit a range of applications. Details of how the mechanical unit cells 4, 6, 8 may be configured are provided below.

Therefore, it can be said that each module 12 caters for multiple sensitivities and have multiple force sensing ranges due to the heterogeneous structure of the mechanical metamaterial as described above. Each module 12, at an individual level, consists of serial springs each providing independent reading of normal component of the force applied on the sensor 10. In one configuration, the metamaterial sensor 10 embodying the present invention works under compression forces and suitable for application as tactile or force sensors. The heterogeneous structure of the sensor 10 with k1>>k2>> . . . >>Kn stiffnesses and the serial mechanical connection allow one to tune the desired sensitivity and force sensing range of each mechanical cell unit 4, 6, 8 of a single module 12, independently.

Figure 2:
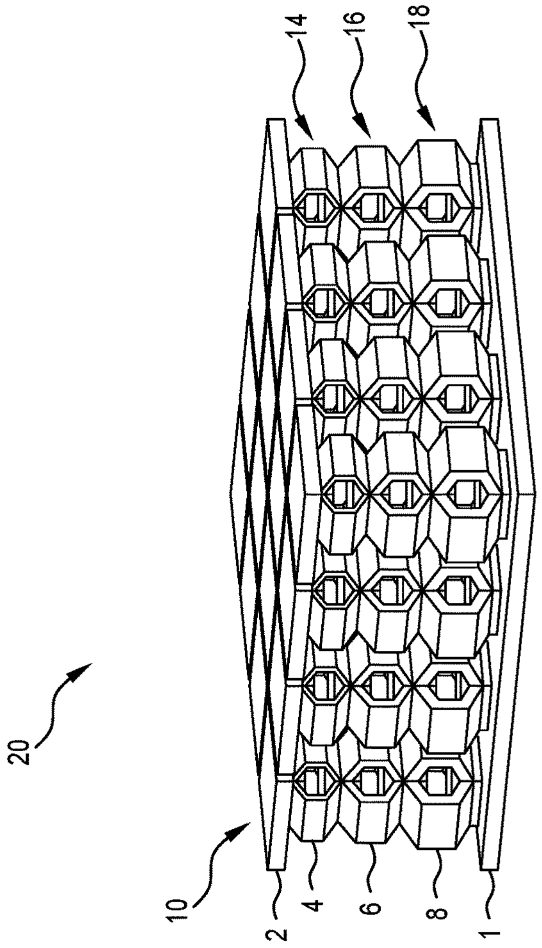
FIG. 2 is a perspective view of a schematic illustration of a sheet array of metamaterial force sensors of FIG. 1.

FIG. 2 shows an array 20 of metamaterial force sensors 10 formed together to cover a specific area. In one configuration, the sensors 10 is joined to form a single sheet array with a common substrate 1 at a base part 5 and a plurality of force transmission mediums 2 coupled to each sensor 10 at the top part 3. The sensors may be joined to form any suitable array formations, including single and multi-layered arrays, depending on use requirements. In one embodiment, the mechanical unit cells 4, 6, 8 and their arrangements in the modules 12 of each sensor 10 is substantially the same across the array 20—in this manner, the stiffness value (k) of each mechanical unit cell 4, 6, 8 across the corresponding layer 14, 16, 18 of the array 20 are substantially the same. In other configurations, additional mechanical link portions may be provided to connect adjacent like-sensors 10 which will allow the connected sensors 10 to provide a joint displacement response to force inputs that span across multiple sensors 10.

Figure 5:
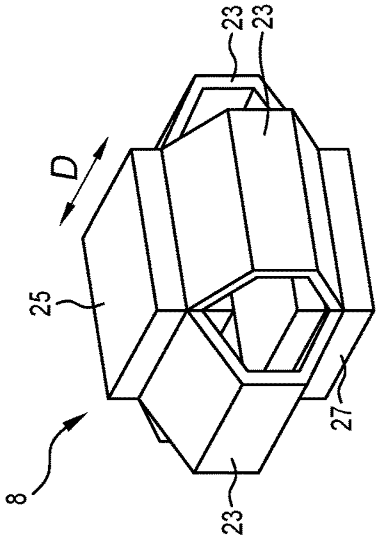
FIG. 5 is a perspective view of a single mechanical unit cell of the sensor in accordance with an embodiment of the present invention.
Figure 6:
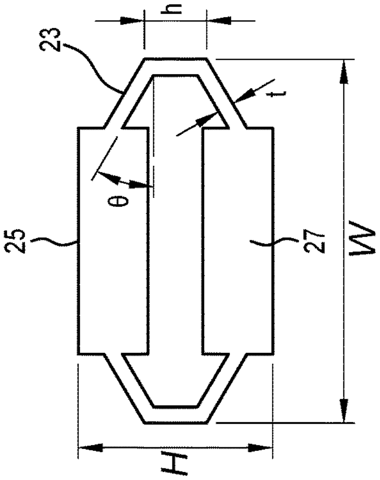
FIG. 6 is a schematic sectional view of the mechanical unit cell of FIG. 5.

FIGS. 5 and 6 provide further details of an exemplary design of a mechanical unit cell 4, 6, 8 according to an embodiment of the present invention, however it is to be appreciated that the mechanical unit cell 4, 6, 8 may be configured of any suitable shape and not limited to the shapes described herein. The exemplary mechanical unit cell 4, 6, 8 is configured with a top plate 25 and a bottom plate 27 connected by a number of resilient angular side plates 23 (arranged in a sideways U-shape). The mechanical unit cell 4, 6, 8 in the preferred embodiment comprises four annularly spaced resilient angular side plates 23; however, other number or configurations of side plates 23 may also be suitable. The mechanical unit cell 4, 6, 8 can be said to have a cross-section that resembles a substantially octagonal shape in the embodiment as illustrated. In one configuration, the resilient material used to form the mechanical unit cells 4, 6, 8 is soft/compliant such as thermoplastic polyurethane (TPU) with a Shore hardness of A85, while in other configurations, the material used may have higher or lower hardness.

The mechanical unit cell 4, 6, 8 is designed such that multiple structural parameters can be altered or “tuned” to result in a desired stiffness value (k) or predetermined displacement response to a particular force input or range of force transmissions. Structural parameters can be preconfigured at the design stage of the metamaterial force sensor 10, and non-limiting examples of tunable structural parameters of the mechanical unit cell 4, 6, 8 could include the following:

- Height (H) of the mechanical unit cell between the top plate 25 and the bottom plate 27,
- Width (W) of the mechanical unit cell including the span of the side plates 23,
- Depth (D) of the top and/or bottom plates 25, 27,
- Thickness (t) of the side plates 23,
- Height (h) of a vertical portion 28 of the side plates 23, and
- Internal angles (θ) of the side plate 23.

A look-up table of the interaction between various design parameters, including height (h) of the vertical portion 28 of the side plates 23, internal angles (θ) of the side plate 23, and thickness (t) of the side plates 23, with the resulting stiffness values (k) are provided below as an example.

| Design Parameters | | | |
|---|---|---|---|
| h (mm) | θ (degrees) | t (mm) | Stiffness (N/mm) |
| 1 | 210 | 1 | 0.0048 |
| 3 | 210 | 1 | 0.0156 |
| 5 | 210 | 1 | 0.0385 |

-continued

| Design Parameters | | | |
|---|---|---|---|
| h (mm) | θ (degrees) | t (mm) | Stiffness (N/mm) |
| 6 | 210 | 1 | 0.1333 |
| 7 | 210 | 1 | 0.3226 |
| 2 | 200 | 0.75 | 0.0091 |
| 2 | 205 | 0.75 | 0.0313 |
| 2 | 210 | 0.75 | 0.0769 |
| 2 | 220 | 0.75 | 0.2564 |
| 2 | 230 | 0.75 | 0.6250 |
| 3 | 200 | 0.5 | 0.0022 |
| 3 | 200 | 0.75 | 0.0031 |
| 3 | 200 | 1 | 0.0048 |
| 3 | 200 | 1.5 | 0.0058 |
| 3 | 200 | 2 | 0.0077 |

Figure 7:
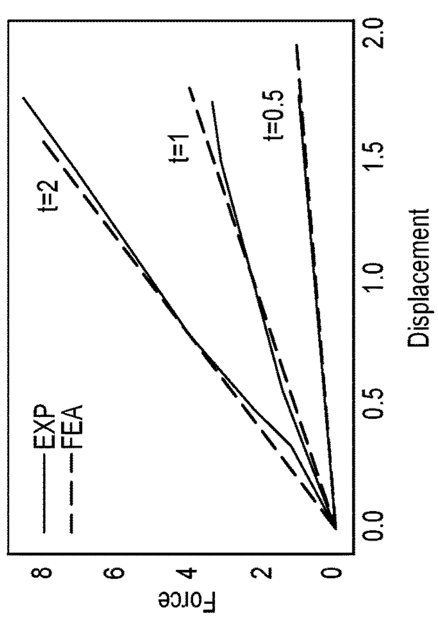
FIG. 7 is a chart showing different response properties of the mechanical unit cell with respect to different pre-configurable structural parameters.
Figure 8:
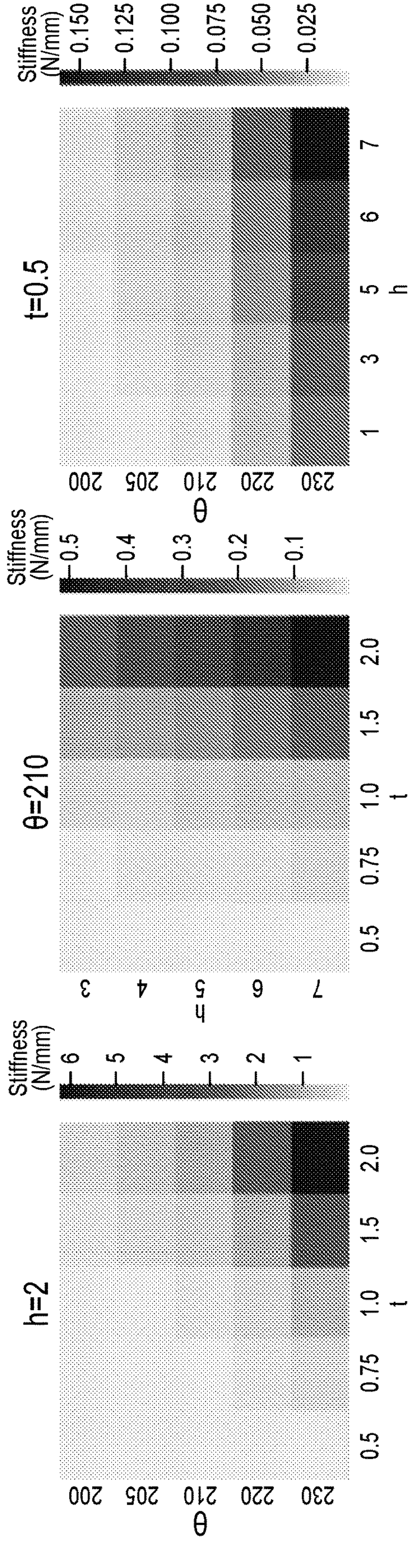
FIG. 8 is a series of charts showing further response values in a heat map for the mechanical unit cell with respect to different pre-configurable structural parameters.

The design of the mechanical unit cells 4, 6, 8 as described show a substantially linear response in FIG. 7 between modifications of key structural parameters discussed above and the corresponding resulting stiffness values (k) of the mechanical unit cell 4, 6, 8. FIG. 8 illustrates similar relationship information between various tunable structural parameters of the mechanical unit cells 4, 6, 8 and the resulting stiffness values (k) in the form of heat maps.

Figure 9:
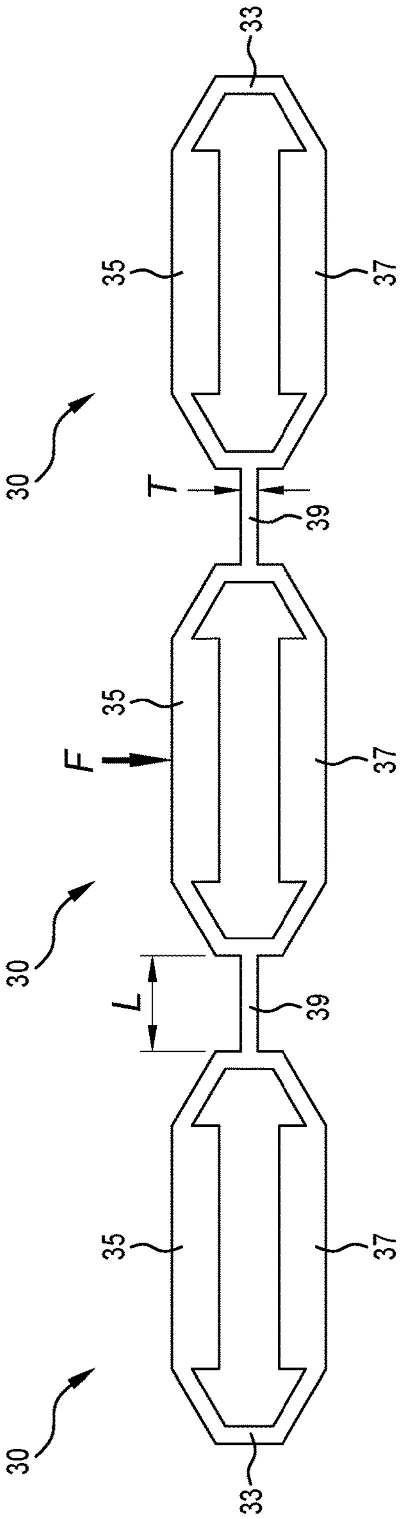
FIG. 9 is a schematic sectional view showing a number of mechanical unit cells being connected horizontally by a link portion in accordance with an embodiment of the present invention.
Figure 10:
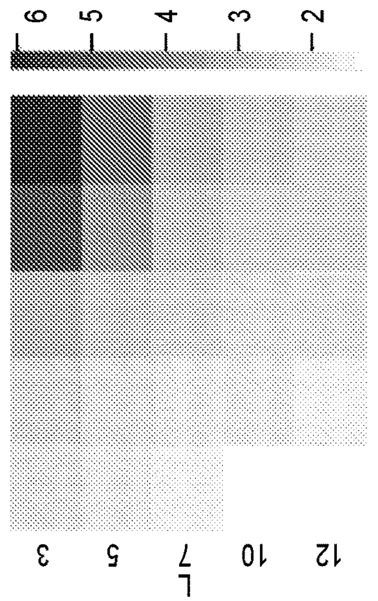
FIG. 10 shows a heap map chart of response values for the mechanical unit cell arrangement of FIG. 9 with respect to different pre-configurable structural parameters.

Referring to FIGS. 9 and 10, in some embodiments, mechanical unit cells 30 having a top plate 35, a bottom plate 37 and angular side plates 33 may also be arranged to be connected in a substantially horizontal plane to one or more adjacent like-unit cell 30 by way of one or more mechanical link portions 39. Further, in other embodiments, entire metamaterial modules 12 may also be coupled to one or more adjacent like-modules 12 by one or more mechanical link portions (not shown), and similarly connections can be made between adjacent like-sensors 10. It is to be appreciated that coupling the mechanical unit cells 30, modules 12 and/or sensors 10 to one or more adjacent unit cells 30, modules 12 and/or sensors 10 will affect the displacement response of the coupled parts to force transmissions. Therefore, the structural parameters of the mechanical link portion, including the thickness (T) of the link and the length (L) of the link may be modelled to compute the effect on stiffness values (k) of the connected parts, as seen in the heat map example shown in FIG. 10.

A number of suitable transduction methods and systems may be used to measure and convert the displacement value (d) of the module 12 in response to force transmissions (F) to an appropriate output signal, including magnetic, resistive and capacitive methods. In the preferred embodiment, a magnetic transducer such as a Hall Effect sensor is used to magnetically determine the displacement between the top part 3 and the base part 5 of the module 12 in response to a force transmission (F), and output this information in the form of an electrical signal. In the preferred embodiment, the magnetic based method is used due to advantages including no physical connection between permanent magnets arranged at the top part 3 of the module 12 and magnetometer located at the base part 5 of the module 12, high sensitivity of magnetometer in changes in the magnetic field, and a linear response in small displacements. In use, upon applying a force input, the position and orientation of a permanent magnet located at the top part 3 will change with respect to the magnetometer. This results in changes in the measured magnetic field and can provide the displacement information. Combining the magnetic field-displacement information with force-displacement curves, we can obtain the applied force magnitude and orientation. Depending on the desired applied force information (magnitude and orientation), the relation between the applied force and magnetic field can be calibrated with respect to any of magnetic field components, the overall magnetic field, or a combination thereof.

Sensitivity and force detection range of the metamaterial force sensor 10 can be calculated using the magnetic transduction method as follows. Sensitivity of the metamaterial force sensor 10 can be defined as the variation in the measured magnetic field with respect to the contact force magnitude and can be formulated as follows:

$$S = \frac{(\Delta B / B_0)}{\Delta F}\ [N^{-1}]$$

where ΔB is the corresponding change in magnetic field, $B_0$ is the initial measured magnetic field without applying the force, and ΔF is the change in the contact force. Considering the $i^{th}$ layer of the sensor force transfer medium as a spring with stiffness $k_i$ and displacement $\Delta d_i$, then the sensitivity of the sensor can be represented as:

$$S_i = \frac{(\Delta B / B_0)/\Delta d_i}{k_i}\ [N^{-1}]$$

at the force detection range of the layer which is considered as:

$$R_i = \Delta d_i^{max} \times k_i\ [N]$$

where $$\Delta d_i^{max}$$

is the maximum displacement of the $i^{th}$ layer before interlocking to the next layer. In these equations, $$\Delta d_i^{max}$$

and $k_i$ are related to the size and stiffness of the mechanical metamaterial structure of sensor force transfer medium (resulted from the structural parameters as discussed above) while $(\Delta B/B_0)/\Delta d_i$ depends on the permanent magnet characteristics (size and magnetisation) and magnetometer sensitivity ($S_M$).

All the above parameters affect the sensitivity and detection range of the metamaterial force sensor 10. Nevertheless, one cannot arbitrarily choose the parameters to achieve the desired characteristics due to trade-offs between different parameters, constraints on the size of the sensor, and functional limitations of the magnetometer. Therefore, a design method is provided below to systematically consider the trade-offs and constraints to achieve the desired operating characteristics of the metamaterial force sensor 10 and to determine the values of the structural design parameters for fabrication of the mechanical unit cells 4, 6, 8 and the module 12.

Figure 11:
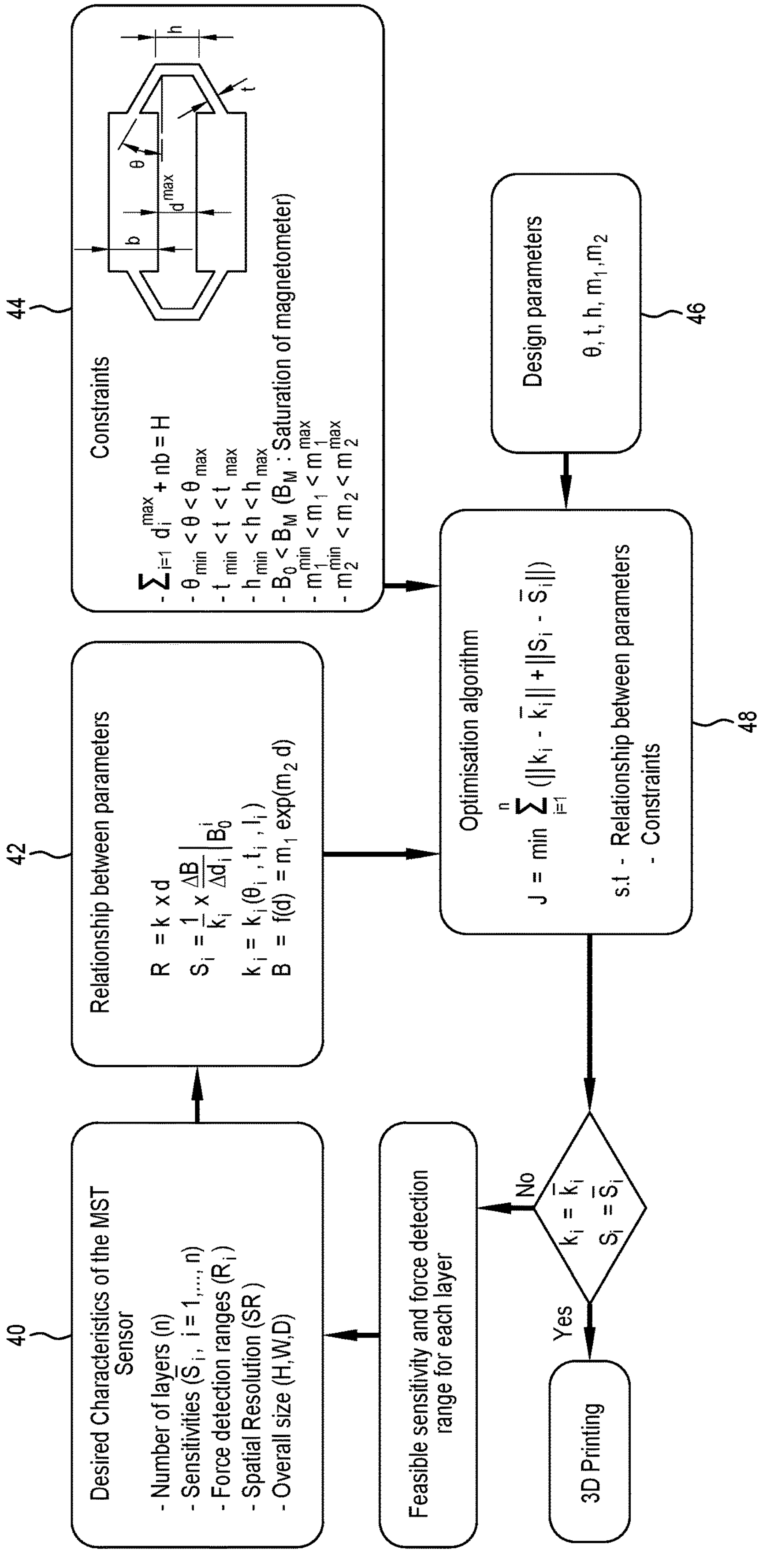
FIG. 11 is a flow chart showing the design methodology for finding the structural parameters for the desired sensitivities and force detection ranges of the metamaterial force sensor in accordance with the present invention.

Referring to FIG. 11, the desired characteristics design block 40 includes the number of layers and their corresponding sensitivities and force detection ranges, spatial resolution of the sensor and the overall size of the sensor. The next block 42 represents the relationship between the sensitivity and force detection range and design parameters as defined in Eq. (1) and Eq. (2). Moreover, the relation between the magnetic field measurement in the magnetometer, B, and the distance, d, of the permanent magnet from the magnetometer embedded in the base layer can be defined as function $f$. In most cases, the function $f$ can be approximated with an exponential function with two constant parameters, $m_1$, $m_2$. The values of these parameters depend on the size and magnetic characteristics of the permanent magnet embedded in the top part 3 of the module 12.

The available design parameters 46 are $$\theta_i, t_i, h_i, d_i^{max}, m_1, m_2$$

which specify the geometrical structural dimensions of the mechanical unit cells 4, 6, 8, the force transfer medium 2 and the behaviour of magnetic field variation with respect to the distance changes. The spatial resolution and size of the metamaterial force sensor 10 will impose constraints 44 on the available range of the design parameters. The other constraints are related to the limitations of the magnetometer regarding magnetic saturation and sensitivity and the size of the permanent magnet that can be embedded in the top part 3 of the module 12.

Since multiple design parameters affect the sensitivity and force detection range of the metamaterial force sensor 10 and each design parameter has a different effect on characteristics of the sensor 10, an optimisation algorithm 48 is executed to compute the structural parameters that will provide the desired characteristics. To this end, an objective function is defined, and minimising said objective function will result in desired sensitivities and stiffness of each mechanical unit cell 4, 6, 8 (also corresponding to a respective detection range) of the metamaterial force sensor 10. The optimisation algorithm 48 can be solved analytically if the relation between different parameters can be defined in the closed-form, otherwise numerical methods can be used. The design parameters obtained from the optimisation algorithm 48 determines the structure of the mechanical unit cells 4, 6, 8 and metamaterial module 12 of the sensor 10, and the resultant structures can be fabricated for example via standard 3D printers.

Figure 12:
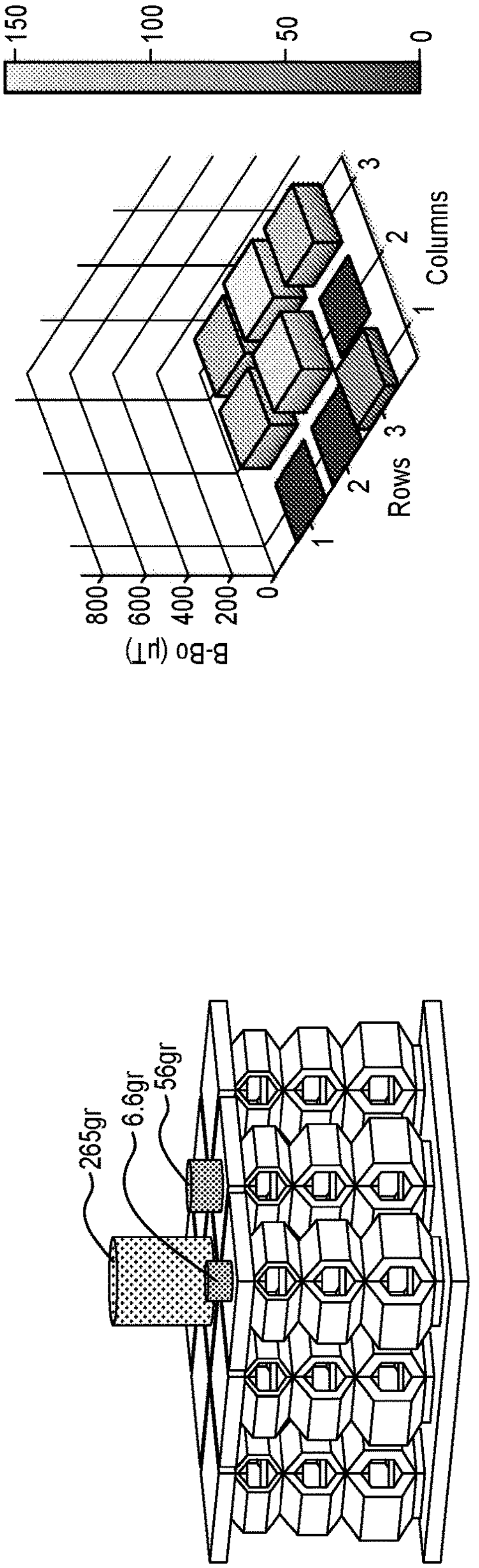
FIG. 12 shows an example of an array of metamaterial force sensors in accordance with an embodiment of the present invention and a chart showing the displacement response of the array for a range of objects with different weight values.
Figure 13:
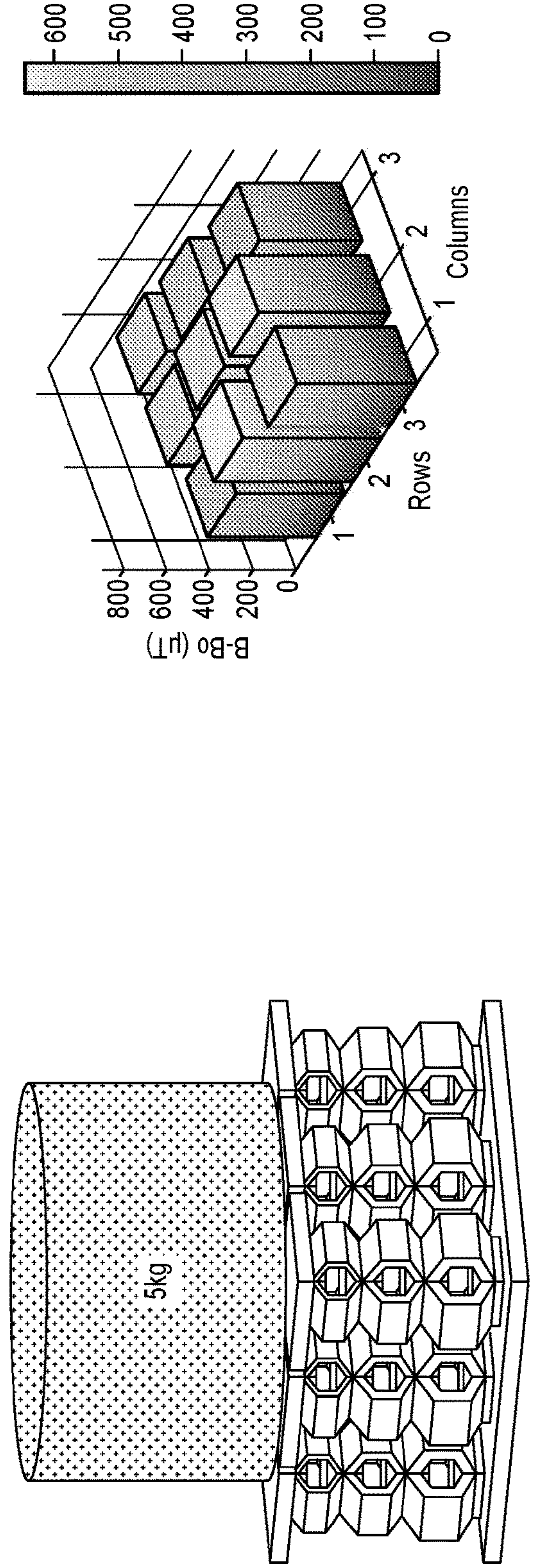
FIG. 13 shows an example of an array of metamaterial force sensors in accordance with an embodiment of the present invention and a chart showing the displacement response of the array for a single large-mass objects.
Figure 14:
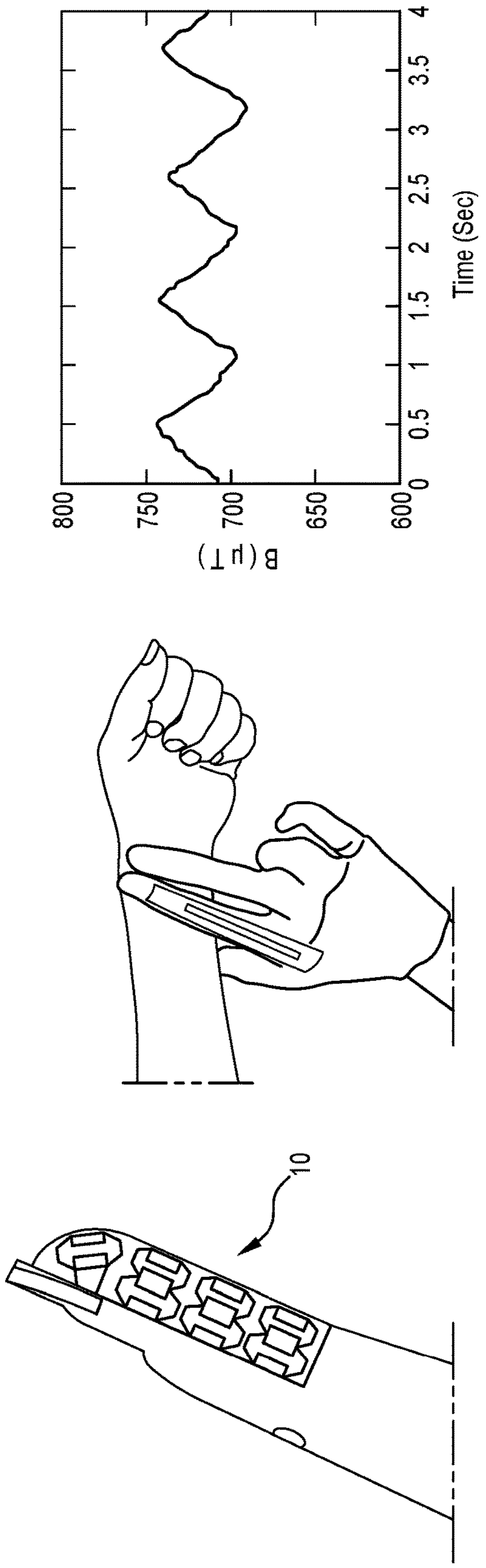
FIG. 14 shows an example of an array of metamaterial force sensors being used as part of a robotic finger and a chart showing the displacement response of the array for pulse detection.
Figure 15:
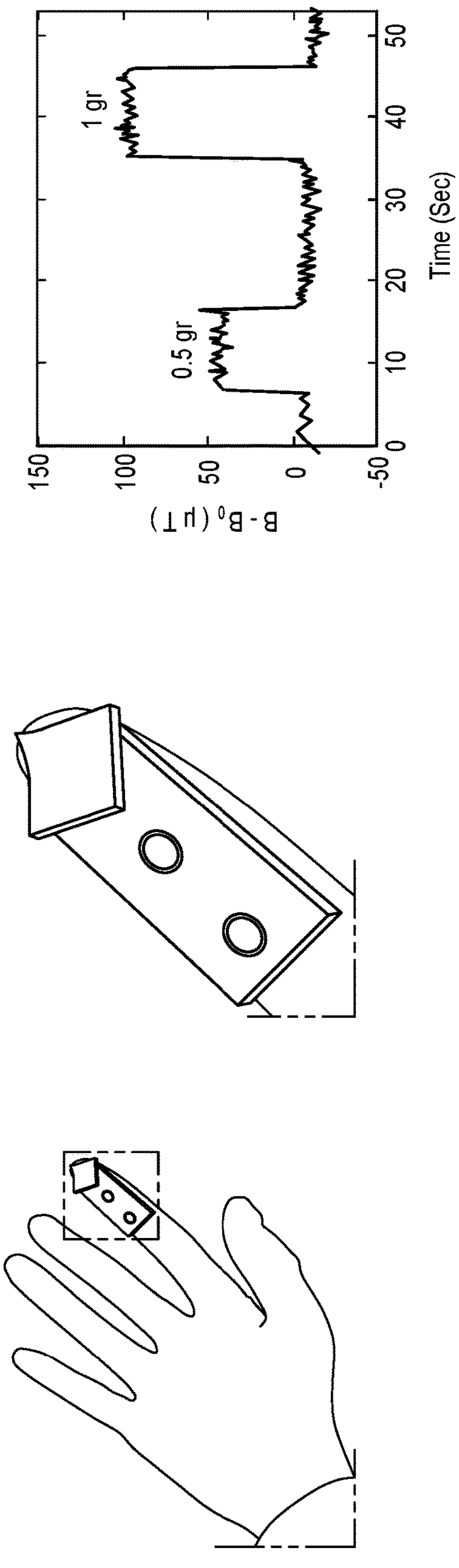
FIG. 15 shows an example of an array of metamaterial force sensors being used as part of a robotic finger and a chart showing the displacement response of the array to objects of different masses.

Referring to FIGS. 12 and 13, it can be seen in the output charts that an array 20 of metamaterial force sensors 10 of the present invention was able to detect force asserted on the sensor 10 by assess of different weights, ranging from 6 grams to 5000 grams, with a high degree of sensitivity. The array 20 of metamaterial force sensors 10 as shown is able to accommodate masses of different shapes, sizes and numbers all on a single array structure. FIGS. 14 and 15 illustrate the incorporation of an array 20 of metamaterial force sensors 10 in the application of a finger of a soft robotic prosthetic hand to detect movement caused by the pulse of a human radial artery and to accurately detect smaller masses.

While the metamaterial force sensors 10 have been described in relation to applications for robotics and prosthetic hands, it will be appreciated that the sensors 10 may be equally suitable for use in other applications not described herein, including, but not limited to, applications in the monitoring of joints for rehabilitation, input for musical instruments such as keyboards and synthesisers, and triggers in remote or game controllers which require multiple levels of sensitivity and force detection ranges.

By way of further background, the majority of conventional tactile sensors are designed to measure a particular range of force with a fixed sensitivity. However, some applications require tactile sensors with multiple task-relevant sensitivities at multiple ranges of force sensing. Preferred embodiments of the present invention provide a new soft tactile sensor based on mechanical metamaterials which exhibits multiple sensitivity regimes due to the step-by-step locking behaviour of its heterogeneous, non-periodic and multi-layered structure. By tuning the geometrical design parameters of the collapsible layers, each layer experiences locking behaviour under different ranges of force which provides different sensitivity of the sensor at different force magnitude.

The integration of a magnetic-based transduction method with the described structure of the invention results in high design degrees of freedom for realising the desired contact force sensitivities and corresponding force sensing ranges. A systematic design procedure can be applied to select appropriate design parameters to produce desired characteristics. The multi-sensitivity soft tactile sensor invention as described has a great potential to be used in a wide variety of applications where different sensitivities of force measurement is required at different ranges of force magnitudes, from robotic manipulation and human-machine interaction to biomedical engineering and health-monitoring.

Preferred embodiments of the multi-sensitivity sensor 10 comprise multiple modules 12 (or individual blocks) and each module 12 consists of multiple mechanical cell units 4, 6, 8 stacked on each other with multiple designed stiffnesses. As a result, the sensor 10 can be advantageously realised in the following non-limiting architectures:

1) A single module 12 with multiple mechanical cell units and each cell unit with different designed stiffness (see FIG. 1, for example).
2) An array of multiple like-modules 12 (multiple modules with the same stiffness values and number of mechanical cell units in each module) (see FIG. 2, for example).
3) An array of multiple different modules 12 (the stiffness values and number of mechanical cell units in each module 12 can be different from the other modules 12) (see FIG. 14, for example).

In each above architecture, the result is a tactile/force sensor 10 having different sensitivity and force sensing ranges.

In the description and drawings of this embodiment, same reference numerals are used as have been used in respect of the first embodiment, to denote and refer to corresponding features.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A metamaterial force sensor, the sensor comprising:
one or more metamaterial modules, each module comprising a plurality of mechanical unit cells operatively interconnected to allow force transmission therethrough; and
a transducer operatively coupled to the or each module, the transducer being configured to output a signal corresponding to a displacement of the or each module in response to a force transmission,
wherein each of the mechanical unit cells provides a predetermined range of displacement, based on preconfigured structural parameters of said unit cell, in response to force transmissions, and wherein at least two of the mechanical unit cells of the or each module are configured with different predetermined ranges of displacement in response to force transmissions.

2. The metamaterial force sensor in accordance with claim 1, wherein the mechanical unit cells are configured with top and bottom plates connected by a number of resilient angular side plates, and wherein the preconfigured structural parameters for altering the displacement response include height, width and thickness of the plates as well as internal angles of the angular side plate.

3. The metamaterial force sensor in accordance with claim 2, wherein the mechanical unit cells are configured with a substantially octagonal cross-sectional shape.

4. The metamaterial force sensor in accordance with claim 2, wherein the top and bottom plates are connected by four annularly spaced resilient angular side plates.

5. The metamaterial force sensor in accordance with claim 1, wherein at least three of the mechanical unit cells of the or each module are configured with different predetermined ranges of displacement in response to force transmissions.

6. The metamaterial force sensor in accordance with claim 1, wherein the mechanical unit cells of each module are stacked in a substantially upright manner with a first end corresponding to a top part of the module and a second end corresponding to a base part of the module.

7. The metamaterial force sensor in accordance with claim 6, further comprising a force transmission medium configured in mechanical communication with the module at the first end.

8. The metamaterial force sensor in accordance with claim 6, further comprising a substrate at the second end for operatively coupling a plurality of modules.

9. The metamaterial force sensor in accordance with claim 6, wherein the mechanical unit cells of the module are arranged so that each descending unit cell in the stack is preconfigured with an increasingly higher stiffness value.

10. The metamaterial force sensor in accordance with claim 6, wherein the mechanical unit cells of the module are arranged so that each unit cell would reach its maximum displacement in response to a force transmission before the next lower unit cell in the stack starts its displacement in response to the same force transmission.

11. The metamaterial force sensor in accordance with claim 1, wherein one or more of the mechanical unit cells of each module is coupled, in a substantially horizontal plane, to a like-unit cell by way of one or more mechanical link portions.

12. The metamaterial force sensor in accordance with claim 1, wherein the transducer operates magnetically to determine the displacement of the or each module in response to a force transmission and outputs the displacement information as an electrical signal.

13. A method of constructing a metamaterial force sensor in accordance with claim 1, the method comprising the steps of:

selecting a predetermined sensitivity range for the sensor;

selecting a predetermined effective force detection range for the sensor;

preconfiguring structural parameters of the plurality of mechanical unit cells to alter the stiffness value in respect of each unit cell such that the unit cells, in combination, cover at least the predetermined sensitivity range and the predetermined effective force detection range;

interconnecting the plurality of mechanical unit cells to form the metamaterial module; and coupling the transducer to the module to output a signal corresponding to a displacement of the module in response to a force transmission.

14. The method according to claim 13, wherein each of the mechanical unit cells in the metamaterial module is configured to overlap in coverage of the predetermined sensitivity range and the predetermined effective force detection range in respect to an adjacently arranged unit cell.

15. The method according to claim 13, wherein the mechanical unit cells of each module are stacked in a substantially upright manner.

16. The method according to claim 15, wherein the mechanical unit cells of the module are arranged so that each descending unit cell in the stack is preconfigured with a higher stiffness value.

17. A metamaterial force sensor, the sensor comprising:

one or more metamaterial modules, each module comprising a plurality of mechanical unit cells operatively interconnected to allow force transmission therethrough; and a transducer operatively coupled to the or each module, the transducer being configured to output a signal corresponding to a displacement of the or each module in response to a force transmission, wherein each of the mechanical unit cells is configured with a predetermined stiffness value based on preconfigured structural parameters of said unit cell, and wherein at least two of the mechanical unit cells of the or each module are configured with different stiffness values.

18. The metamaterial force sensor in accordance with claim 17, wherein the mechanical unit cells of each module are stacked in a substantially upright manner.

19. The metamaterial force sensor in accordance with claim 18, wherein the mechanical unit cells of the module are arranged so that each descending unit cell in the stack is preconfigured with a higher stiffness value.

20. The metamaterial force sensor in accordance with claim 18, wherein the mechanical unit cells of the module are arranged so that each unit cell would reach its maximum displacement in response to a force transmission before the next lower unit cell in the stack starts its displacement in response to the same force transmission.

* * * * *